Oct. 19, 1943.  H. R. SEGAL  2,332,266

EYEGLASS CASE

Filed May 5, 1939

Patented Oct. 19, 1943

2,332,266

UNITED STATES PATENT OFFICE 2,332,266

EYEGLASS CASE

Hyman R. Segal, New York, N. Y.

Application May 5, 1939, Serial No. 272,019

2 Claims. (Cl. 206—6)

The present invention deals with eyeglass cases and the dominant object thereof resides in the provision of a lining having three functions; namely one, in sustaining the entire weight of the case in the opened relation of the latter; two, in acting as a wiper for the lenses in the fully opened relation of the case; and three, in serving as cushioning means for the lenses when the case is closed. The invention has a further object to provide novel disconnectable means for removably sustaining one end of the lining or wiper. The invention has a further object to provide a serviceable mount for supporting the eyeglass frame within the case against displacement longitudinally of the case. The invention further contemplates as an object the provision of inclined means accessible to one end of an eyeglass frame to facilitate its withdrawal from the case after the latter has been opened. Other objects, advantages, and features of the invention will be apparent from the teachings of the following detailed description considered in connection with the accompanying drawing wherein:

Fig. 1 is an open perspective view of the eyeglass case according to the invention.

Fig. 2 is a transverse sectional view of Fig. 1 however illustrating the case closed.

Fig. 3 is an open view of the case showing the wiper support thereof disassociated from its wiper.

Fig. 4 illustrates the manner of using the wiper for cleaning the lenses of an eyeglass frame.

Fig. 5 is a view similar to Fig. 4 illustrating the wire support clamping the wiper and Fig. 6 is a sectional view on the line 6—6 of Fig. 5.

The eyeglass case generally denoted 10 includes a container or box 11 and the hinged cover 12. Fixedly carried by the bottom wall 13 of the container is a mount 14 having a front wall 15 provided with a concaved portion 16 from which extends the curved lip or projection 17.

Associated with the container 11 is a slidable latch 18 provided with a lip 19 adapted to interlock with keeper 20 extending from the cover 12. The latch is normally urged outwardly by the helicoidal spring 21 in part confined within the fixed mount 14 and to actuate the latch finger piece 22 is pushed inwardly against the resistance of spring 21 to disengage lip 19 from the socket 23 of the keeper 20. With the latch disengaged, loop 24 of the springs 25 coiled about the fulcrum pin 26 urges the cover rearwardly and thus the latter opens automatically, the fulcrum pin serving as shown to rotatably support the spaced bearings 27 depending from the rear edge of the cover.

According to the invention a removable wiper of cloth or any other suitable material is employed to sustain the body of the case in the open relation of the latter. For this purpose a relatively heavy curved shaped wire 28 is utilized. One end 29 of this wire is fixedly secured to the inner face of the cover by a suitable weld 30. This wire is adapted to receive and be threaded into socket or tubing 31 of the wiper 32. This socket is formed in any suitable manner as by first folding a marginal part of the wiper over the body thereof and securing both of the latter by a line of stitching 33.

With the wiper sustained by the support or resilient wire 28, the free end 34 of the latter can be retained in a closed relation by positioning this end behind the fixed lug or keeper 35.

Having positioned the wiper on the wire support 28 and with the free end 34 thereof held resiliently locked in back of the keeper 35, the wiper may be conveniently folded within the cover, against the inclined and fixed baffle 36 of the container 11 to lay around and against the mount 12 as well as against wall 13 of the container as shown in Fig. 1. Thus the wiper serves as a lining for cushioning the eyeglass frame and its lenses when the cover is closed.

In the opened position of the cover, the frame of the eyeglasses may be folded in the usual manner and the bridge 40 of the frame 43 is positioned on the mount 14 but in back of its lip 17 whereby the nose grips 41 resiliently straddle and clamp against the sides of the mount now covered by the wiper 32. Lip 17 in cooperation with the upper margin 42 of the container or box 11 prevent accidental removal of the eyeglass frame or carrier from the case. Thus if the eyeglass frame be positioned in the case as shown and the cover be hingedly closed, the complementary locking means 19 and 20 maintain such closed relation of the cover at which time the folded wiper straddles the eyeglass frame 43 now prevented from shifting lengthwise of the case by reason of the nose pieces 41 clamping against the sides of the mount and at this time the frame 43 is prevented from shifting transversely of the case due to the action of the cooperating stop lip 17 and the upper marginal portion 42 of the container 13. It follows that in the closed relation of the cover the eyeglass frame is prevented from longitudinal and transverse slippage or rattling relative to the case.

Where it is desired to remove the eyeglass frame and its carrying lenses from the keeper, the cover is first opened. This is accomplished by applying finger pressure against manipulator 22. It follows that the lip 19 is disengaged or unlocked from the socket of the keeper 20.

The wire loop 24 now acts to automatically raise the cover and after such operation access may thus be had to the eyeglass frame.

In removing the frame 43, nose grips 41 are separated slightly and the body of the frame is moved rearwardly. Consequently bridge 40 will ultimately strike the wiper which lays against the inclined baffle 36 which serves as cam means to facilitate lifting of the eyeglass frame whereby the bridge 45 is disposed above the elevation of the stop lip 17. Thus access may be readily had to bridge 40 and the entire frame 43 may be conveniently withdrawn from the container.

In case it is desired to clean the lenses, the wiper is removed from the container and out of the cover and folded to straddle the lenses of the frame as illustrated in Fig. 4. Thus one hand only of the operator may be used during this operation at which time the entire weight of the case is sustained by the wiper.

When the wiper or lining becomes soiled, it may be readily replaced by a new wiper. To this end the operator merely removes end 34 of the wiper carrier wire 28 from in back of keeper 35. The inherent spring or wire 28 acts to shift its free end forwardly of the cover and upwardly when it is released from its keeper.

Hence the wiper may be readily withdrawn from its arcuate wire support 28 and a new wiper or lining readily threaded thereon and thereafter the wire support is again locked behind its keeper to be completely within the cover and adjacent an inside face of the upper wall thereof.

In instances where it is desired to remove the eyeglass frame from the container upon the application of an upward thrust to the folded arms 44 by finger pressure, recess 16 serves as convenient means to permit the finger of the operator to be arranged sufficiently under the folded and crossed arms 44. Thus the nose pieces 41 may be readily shifted to be detached from the covered mount. Subsequently the rear part of the frame 43 abuts the covered baffle 36 and the frame 43 automatically lifts to permit convenient removal thereof from the case. If the cover be moved to a closing position lip 19 of the latch 18 automatically interlocks with the keeper 20 to hold the cover closed.

As shown in Figs. 5 and 6 the resilient wire 28 is utilized as a clamp for holding one end of the wiper against the cover. In this connection it will be observed that the tubing 31 constitutes bead means characterizing a stop against the wire 28 which in this instance acts as an abutment when in a locked or closed relation. And in such relation the wire or support clamps wiper 32 against the cover 12. If therefore the cover be opened the wiper may be removed from the container 11 as in the case of Fig. 4 and the stop means 31 prevents the wiper from slipping out of the cover when the wire is locked in a clamping relation against the wiper as is evident from Fig. 6.

While the invention has been specifically described in detail, it is to be understood that it is not limited to specific details herein described but is capable of other adaptations and modifications within the scope of the appended claims.

I claim:

1. In combination, a container, a cover hinged to said container, a wire member having one end only fixedly secured to an inside forward marginal portion of said cover, a wiper having beaded means threaded on said wire member and the latter including a free end, and a keeper at another forward marginal portion of said cover for disconnectably coupling said free end to dispose said wire member in clamping relation against said beaded means to hold the latter against said cover.

2. In combination, a container, a cover hinged to said container, a bowed and resilient wire member having one end only fixedly secured to an inside forward marginal portion of said cover, a wiper having beaded means threaded on said wire member and removably sustained by the latter, said wire member including a free end, and a keeper fixed at another forward marginal portion of said cover for disconnectably coupling said free end to dispose said wire member in clamping relation against said beaded means to hold the latter against said cover.

HYMAN R. SEGAL.